Patented Nov. 12, 1935

2,020,954

UNITED STATES PATENT OFFICE 2,020,954

PROCESS OF REFINING LUBRICATING OIL

John M. Musselman, Cleveland, Ohio, assignor to The Standard Oil Company, Cleveland, Ohio, a corporation of Ohio No Drawing. Application June 8, 1932, Serial No. 616,102

3 Claims. (Cl. 196—147)

The preparation of lubricating oils has customarily been carried out by treating more or less drastically with sulphuric acid. While such practice is well established by long usage in the art, it has however, certain important disadvantages. A process which is capable of yielding improved results and with simple and uncomplicated procedure is accordingly a fundamental desideratum in the art, and highly desirable.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

While any usual or desired type of stock may be treated with advantage by the process, I shall describe the invention by reference more particularly to operation with a rather heavy lubricating stock taken from mid-continent oil, this simply illustrating the procedure and the character of advantages which may be realized from the process. The oil to be treated, for instance a stock of 300–400 viscosity at 100° F., is subjected to the action of aluminum chloride and clay, these being either previously intimately mixed together and then added to the oil, or being mixed directly into the oil, as most convenient. The amounts of aluminum chloride and clay may vary somewhat with the nature of the stock being treated, but in the case of such a stock as aforementioned by way of example, may range from 5 to 10 per cent of aluminum chloride, and 5 to 10 per cent of clay. The clay employed may be any efficient clay such as heretofore used for decolorizing. After the aluminum chloride and the clay have been introduced, the mixture is thoroughly agitated at an elevated temperature, which may be in general between 300 and 500° F. The length of time of agitation may vary somewhat dependent upon the temperature, for instance from ½ to 4 hours, higher temperatures requiring shorter treating time in general. After the desired thorough subjection to the action of reagents, the oil is separated therefrom, for instance by being run through a filter-press or the like. No further treatment is required, unless in some instances where it is desired to reduce by steam distillation in order to raise the viscosity. Starting with a stock for instance of gravity 24.1, viscosity index 68, viscosity gravity constant 0.850, and color 8, employing such treatment with 10 per cent aluminum chloride and 10 per cent fuller's earth for ½ hour at 300° F., it is capable of yielding a product with gravity 27°, viscosity index 81, viscosity gravity constant 0.838, and color 3½. Similarly, treating for ½ hour at 350° F. on the same stock, employing 10 per cent aluminum chloride and 10 per cent fuller's earth, a product may be obtained having a gravity 28° A. P. I., viscosity index 90, viscosity gravity contant 0.834, and color 3½. (By viscosity index is meant the ratio of viscosity at 100° F. compared with viscosity at 210° F. as described for instance in Chemical & Metallurgical Eng., vol. 36, page 618, and by viscosity gravity constant, the ratio of viscosity at 100° compared with specific gravity at 60° F. as described for instance in Journal of Industrial & Engineering Chem., vol. 20, page 641.) Where the stock employed contains wax which it is desired to eliminate, this may be removed by suitable means, as chilling and filter-pressing, after the aluminum chloride treatment. My process is also not inconsistent with the use of acid, and a stock which has been treated with sulphuric acid may be very advantageously subjected to aluminum chloride and clay as above set forth.

Treatment of lubricating stocks in accordance with the present invention is thus seen to greatly increase the lubricating qualities of the oil. The viscosity index is raised, and the viscosity gravity constant is lowered, and the oil is very resistant to oxidation. Unlike treatment with aluminum chloride alone, with its consequent necessity of further refining, the present process is capable of yielding finished products directly.

Other modes of applying the principle of the invention may be employed, change being made as regards the details described, provided the features stated in any of the following claims, or the equivalent of such, be employed.

I therefore particularly point out and distinctly claim as my invention:—

1. A process of refining lubricating oils, which comprises subjecting a lubricating stock to the simultaneous action of 5 to 10 per cent of aluminum chloride and 5 to 10 per cent of clay at a temperature of 300–500° F. for ½–4 hours.

2. A process of refining lubricating oils, which comprises subjecting a mid-continent lubricating stock of about 68 viscosity index to the simultaneous action of 5 to 10 per cent of aluminum chloride and 5 to 10 per cent of clay at a temperature of 300–500° F. for ½–4 hours.

3. A process of refining lubricating oils, which comprises subjecting a mid-continent lubricating stock of about 68 viscosity index to the simultaneous action of 10 per cent of aluminum chloride and 10 per cent of fuller's earth at a temperature of about 350° F. for ½ hour.

JOHN M. MUSSELMAN.